United States Patent [19]

Okazaki et al.

[11] Patent Number: 5,704,442
[45] Date of Patent: Jan. 6, 1998

[54] FRAME STRUCTURE FOR A MOTORCYCLE

[75] Inventors: Hiroshi Okazaki; Ryoji Nakajima, both of Saitama, Japan

[73] Assignee: Honda Giken Kogyo Kabushiki Kaisha, Tokyo, Japan

[21] Appl. No.: 466,283

[22] Filed: Jun. 6, 1995

[30] Foreign Application Priority Data

Jul. 13, 1994 [JP] Japan .................... 6-161521

[51] Int. Cl.⁶ .................................. B62K 11/02
[52] U.S. Cl. .................. 180/219; 180/311; 280/281.1
[58] Field of Search ..................... 180/219, 311; 280/281.1, 274, 781, 785

[56] References Cited

U.S. PATENT DOCUMENTS 2,454,046  11/1948  Fields ................... 180/219 X
4,226,296  10/1980  Higaki .................. 180/219
4,673,190   6/1987  Ahlberg ............... 180/219 X
5,284,221   2/1994  Warne .............. 280/281.1 X

FOREIGN PATENT DOCUMENTS 56-45822    10/1981  Japan .
4-292283 A  10/1992  Japan .................. 180/219

Primary Examiner—Victor E. Johnson
Attorney, Agent, or Firm—Birch, Stewart, Kolasch & Birch, LLP

[57] ABSTRACT

A frame structure for a motorcycle provided with a sub-frame extending forwardly from pivot plates fixed at the lower ends of a main frame. The sub-frame includes a U-shaped member having right and left opening ends thereof connected to the pivot plates at the lower ends of the main frame. The sub-frame extends approximately horizontally and forwardly from the connecting portions so that the front end portion of the sub-frame is not connected to the down frames.

16 Claims, 8 Drawing Sheets

FRAME STRUCTURE FOR A MOTORCYCLE

BACKGROUND OF THE INVENTION

1. Field of the Invention

The present invention relates to a frame structure for a motorcycle.

2. Description of Background Art

For the frame structure of a motorcycle, there have been known a cradle type, a diamond type, a back-bone type and a step-through type. Of these types, for the purpose of supporting an engine of a relatively large displacement, the cradle type or the diamond type has been conventionally adopted.

The cradle type is so constructed that a pair of right and left down frames suspended downwardly from a head pipe are curved at a midpoint and are made to extend rearwardly in the horizontal direction, and the rear ends thereof are connected to the lower ends of the main frame, thereby surrounding the whole surface of an engine. On the other hand, the diamond type has a construction, as disclosed in Japanese Utility Model Laid-open Application No. SHO 56-45822, wherein the down frames extend directly downwardly from the head pipe. A frame is not provided between the lower ends of the down frames and the lower ends of the main frame. The rigidity of the portion therebetween is supported by the engine itself.

The cradle type frame is excellent in rigidity. However, it has disadvantages in weight and cost thereof. In the diamond type frame, since the engine serves as the frame, it has an advantage with regard to the weight thereof. However, brackets for mounting guard pipes of the engine, steps and a stand must be provided for each member, thereby complicating the manufacturing processes of the frame structure.

SUMMARY AND OBJECTS OF THE INVENTION

To solve the above problems, a sub-frame is additionally provided on a diamond type frame of a motorcycle. The sub-frame is U-shaped in a plan view, and the right and left opening ends of the sub-frame are connected to the pivot plates at the lower ends of the main frame. Further, the front end portion of the sub-frame extending approximately horizontally and forwardly from the connecting portions is not connected to the lower ends of the down frames but is positioned lower than the lower ends of the down frames.

In this case, guard pipes of the engine, steps or a stand can be mounted between the lower end portions of the down frames and the front end portion of the sub-frame.

Even in the case where the front end portion of the sub-frame is not supported on the lower end portions of the down frames, the whole frame can ensure sufficient rigidity because of the rigidity of an engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Hereinafter, one embodiment of the present invention will be described with reference to the accompanying drawings.

Figure 1:
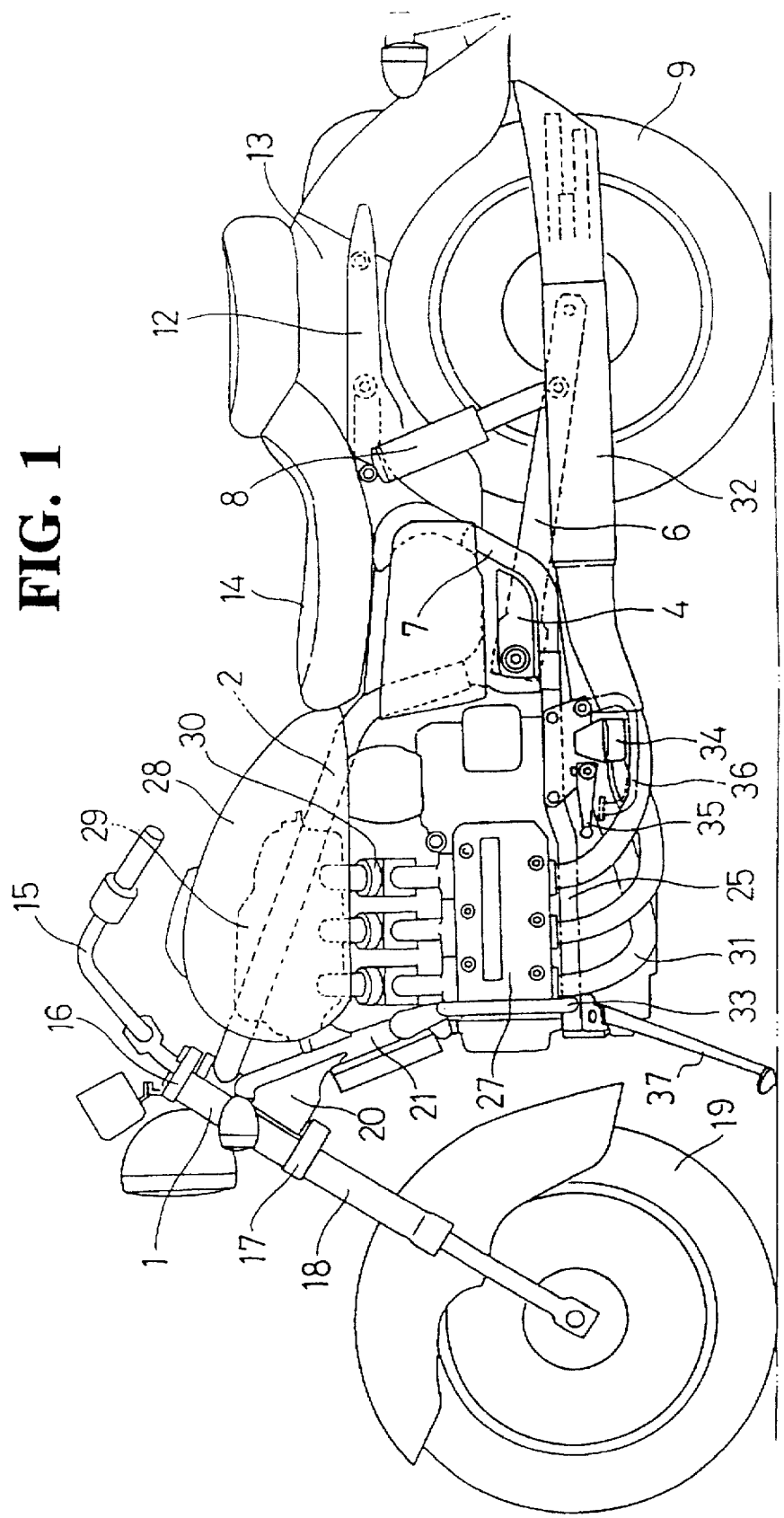
FIG. 1 is a side view showing the whole construction of a motorcycle to which an exhaust structure of the present invention is applied.
Figure 6:
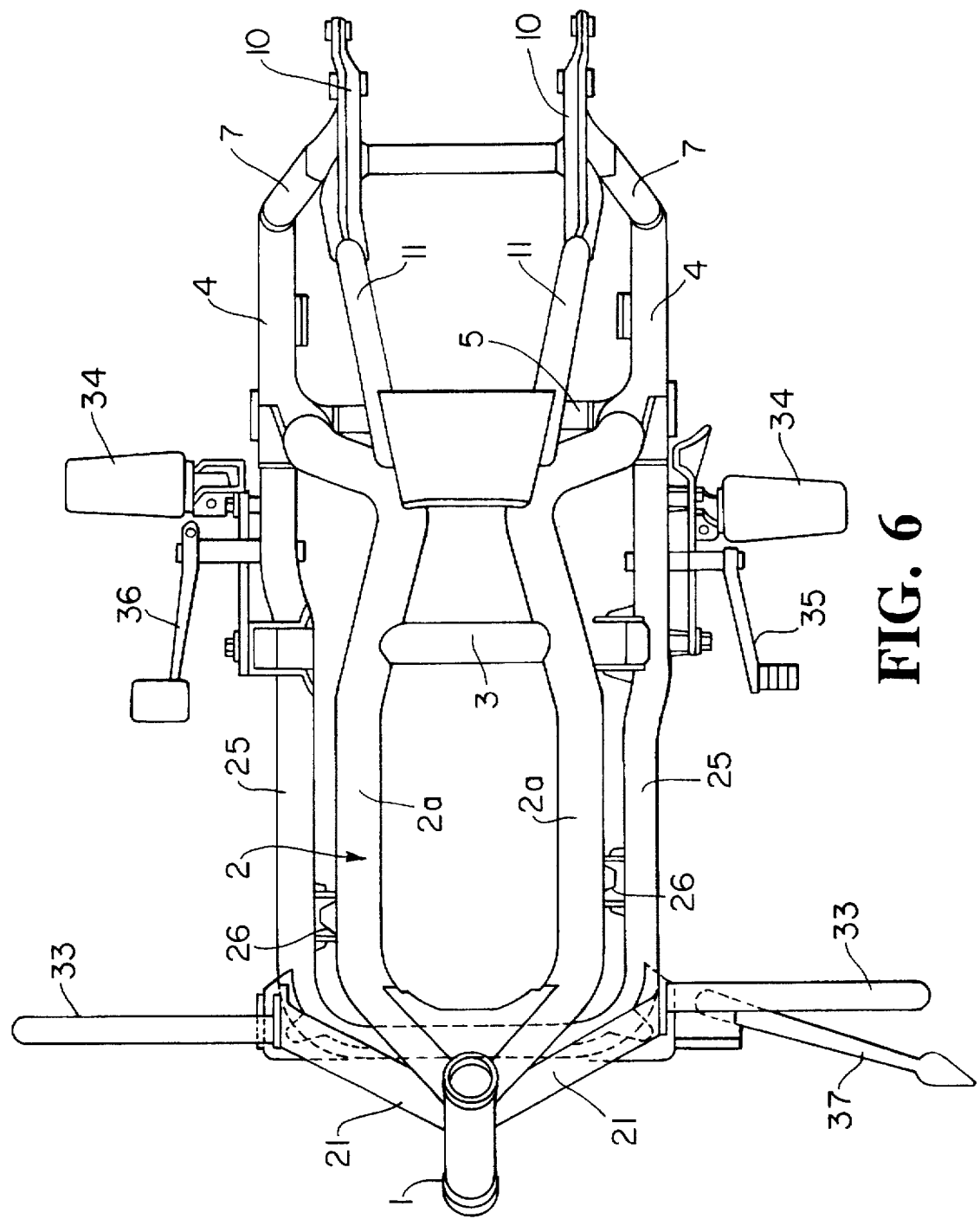
FIG. 6 is a plan view of the frame structure of the motorcycle.

Referring to FIG. 1, with respect to a frame structure of a motorcycle, a main frame 2 extends obliquely, rearwardly, and downwardly from a head pipe 1. The main frame 2 is composed of a pair of right and left pipe members 2a, 2a as shown in FIG. 6. In FIG. 6, a cross-pipe 3 is provided to secure together intermediate portions of the right and left pipe members 2a. A pair of right and left pivot plates 4 are fixed at the lower end portions of the right and left pipe members 2a, and a pivot 5 is positioned between the right and left pivot plates 4.

The front ends of swing arms 6 are turnably supported on the pivot 5 at each side thereof, and dampers 8 are provided between intermediate portions of the swing arms 6 and rear frames 7 which extend obliquely, rearwardly, and upwardly from the pivot plate 4. The shaft of a rear wheel 9 is supported at the rear ends of the swing arms 6.

Brackets 10 are fixed on the upper end of the rear frame 7, and auxiliary pipes 11 are provided to be positioned between the brackets 10 and the intermediate portions of the pipe members 2a. Rearwardly extending seat rails 12 are mounted on the brackets 10, and a rear fender 13 is mounted on the seat rails 12. A seat 14 is supported on the rear fender 13.

In FIG. 1, a steering shaft which is rotatable by a handle 15 is inserted into the head pipe 1. An upper bridge 16 is mounted on the upper end of the steering shaft and a lower bridge 17 is mounted on the lower end of the steering shaft. The upper half portions of a pair of right and left front fork portions 18 are held between the upper bridge 16 and the lower bridge 17. The shaft of a front wheel 19 is supported at the lower ends of a pair of the right and left front fork portions 18.

Figure 4:
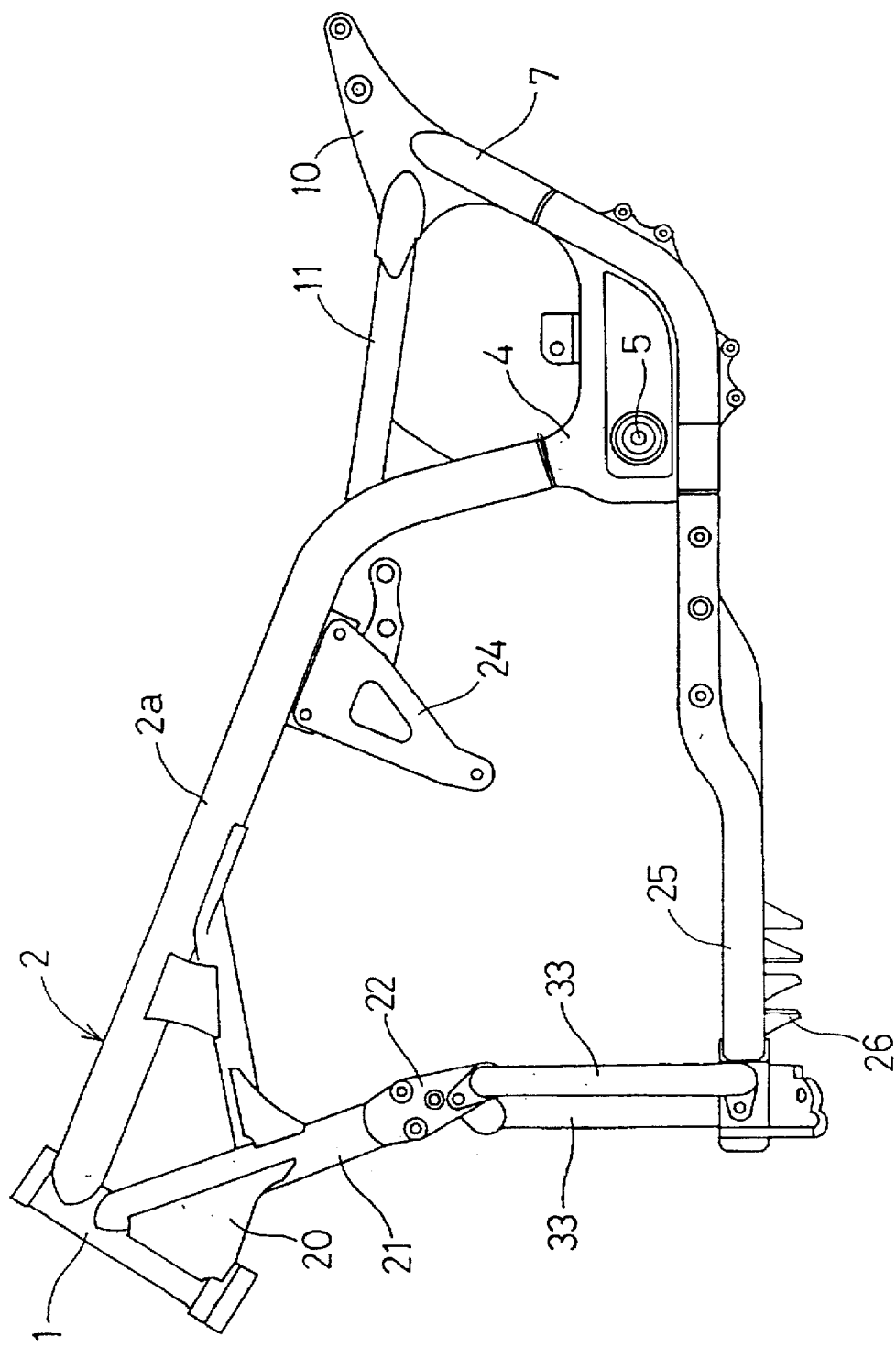
FIG. 4 is a side view of the frame structure of the motorcycle.
Figure 5:
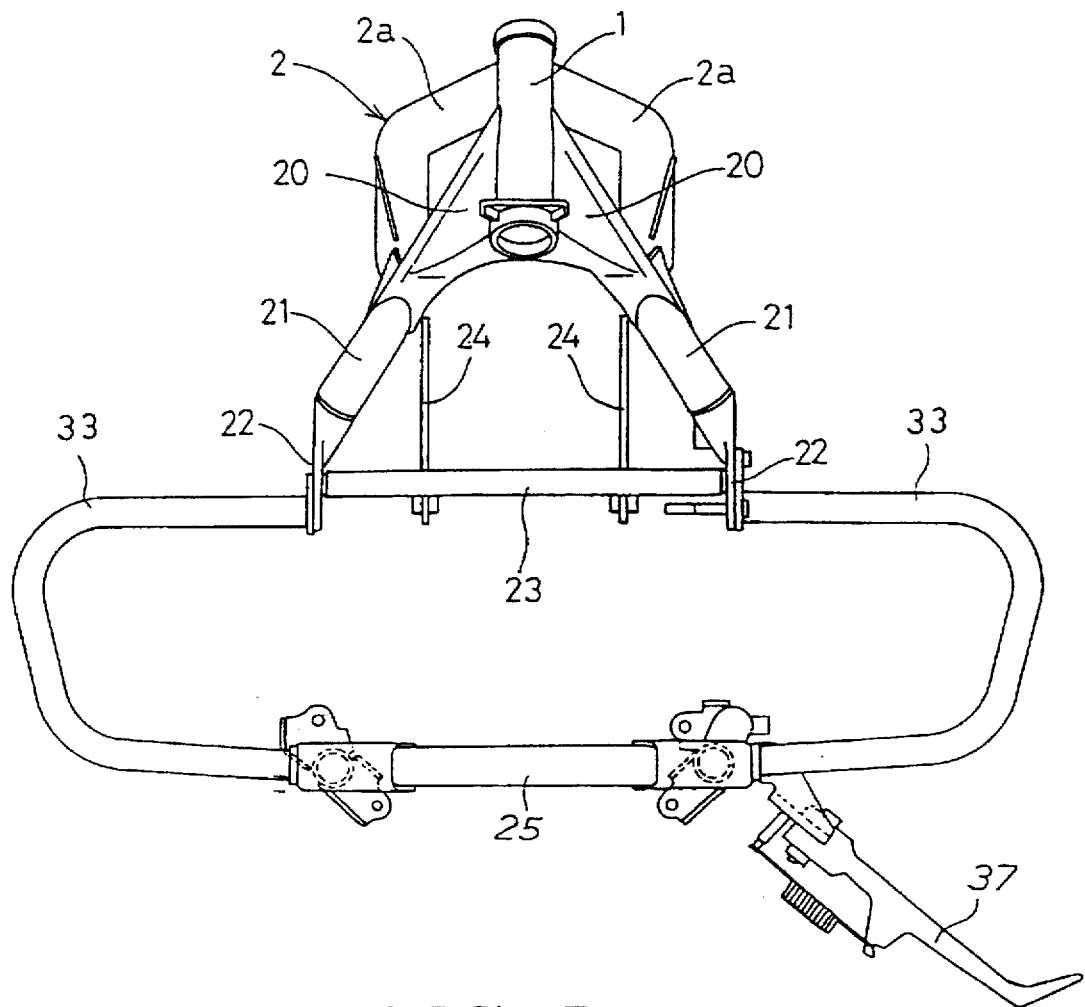
FIG. 5 is a front view of the frame structure of the motorcycle.

On the other hand, the upper end portions of a pair of right and left down frames 21 which extend downwardly are fixed on the head pipe 1 through a gusset plate 20, as shown in FIGS. 4 and 5. A pair of right and left supporting brackets 22 are mounted at the lower ends of the down frames 21, and a cross-pipe 23 is positioned between the right and left supporting brackets 22, as shown in FIG. 5.

A pair of supporting stays 24 are suspended downwardly from the intermediate portions of the right and left pipe members 2a constituting the main frame 2. A sub-frame 25 extends forwardly from the pivot plates 4 fixed at the lower end portions of the main frame 2 toward the head pipe 1, as shown in FIG. 6.

Figure 7:
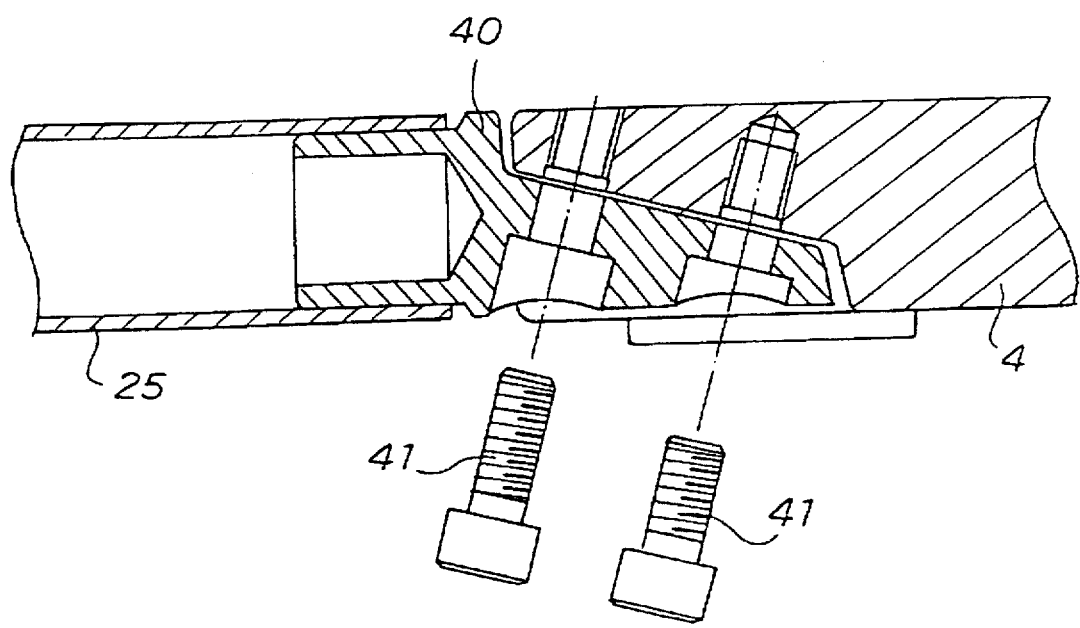
FIG. 7 is an enlarged view of a connecting portion of a sub-frame employed in the frame structure of the motorcycle.

The sub-frame 25 has a U-shape in a plan view, and right and left open ends, i.e. both ends at the right side of the sub-frame 25 in FIG. 6 thereof, are connected to the pivot plates 4 at the lower ends of the main frame 2. The connection between the sub-frame 25 and pivot plate 4 is performed in the manner as shown in FIG. 7, wherein a connecting member 40 is inserted in the rear end opening portion of the sub-frame 25 and is fixed by means of a bolt (not shown in FIG. 7) or the like, and the corresponding inclined surfaces of the connecting member 40 and the pivot plate 4 are butted and connected to each other by means of bolts 41, 41.

Both sides of the sub-frame 25 extend forwardly from the connecting portions approximately in the horizontal direction. The front end portion thereof is positioned lower than the lower ends of the down frames 21. Namely, the sub-frame 25 is not connected to the down frames 21.

A pair of brackets 26 are fixed on both sides of the sub-frame 25. A horizontal six-cylinder engine 27 is supported by the brackets 26, the supporting stays 24 suspended from the main frame 2, and the supporting brackets 22 of the down frames 21, as shown in FIG. 1.

A fuel tank 28 is mounted in such a manner to stride over the main frame 2, and an air cleaner 29 is disposed under the fuel tank 28 for supplying air from the air cleaner 29 to the engine 27 by way of carburetors 30. A muffler 32 is connected to the downstream ends of exhaust pipes 31, each introduced from the respective cylinder of an engine 27.

Figure 2:
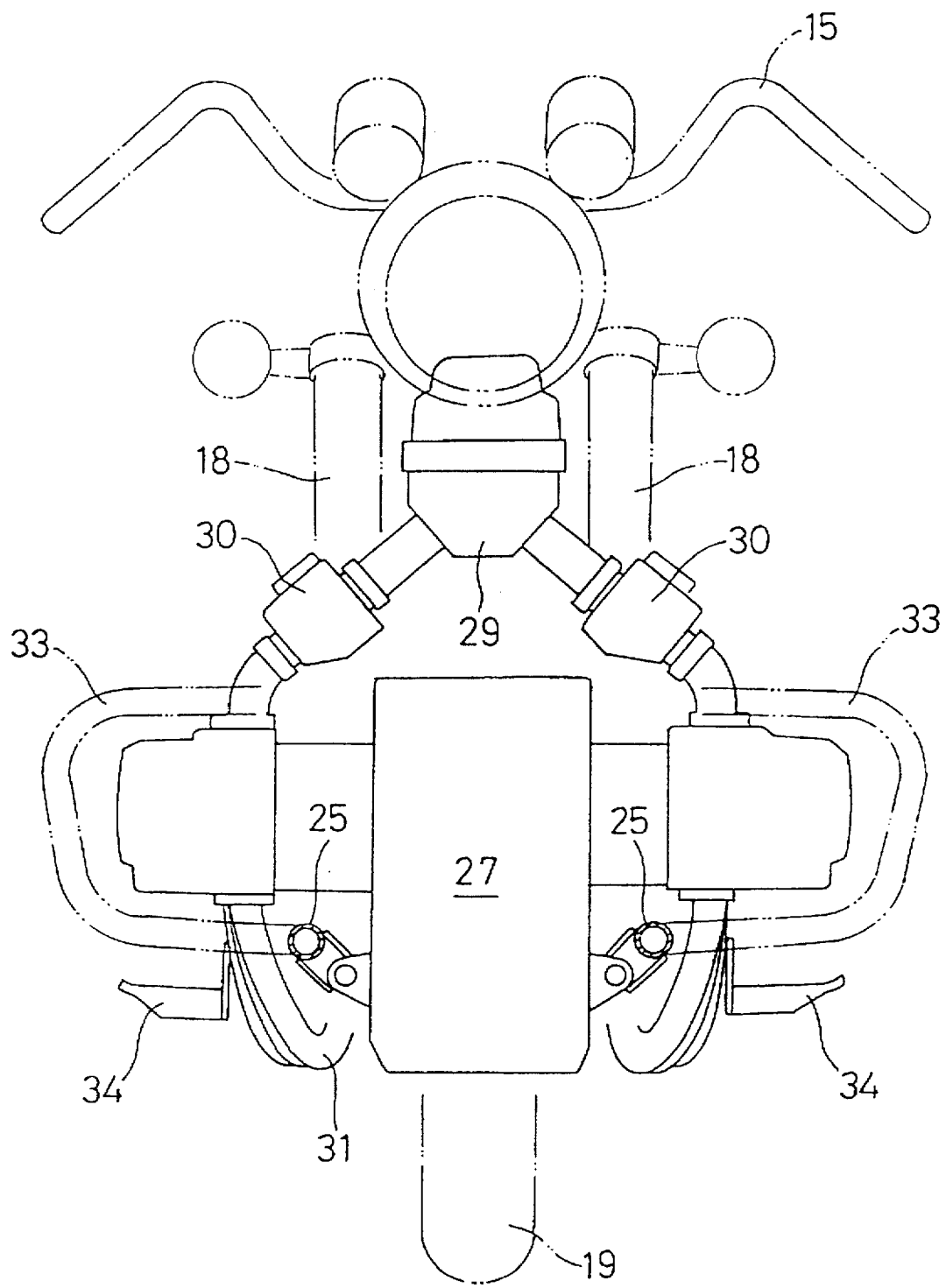
FIG. 2 is a front view of the motorcycle.
Figure 3:
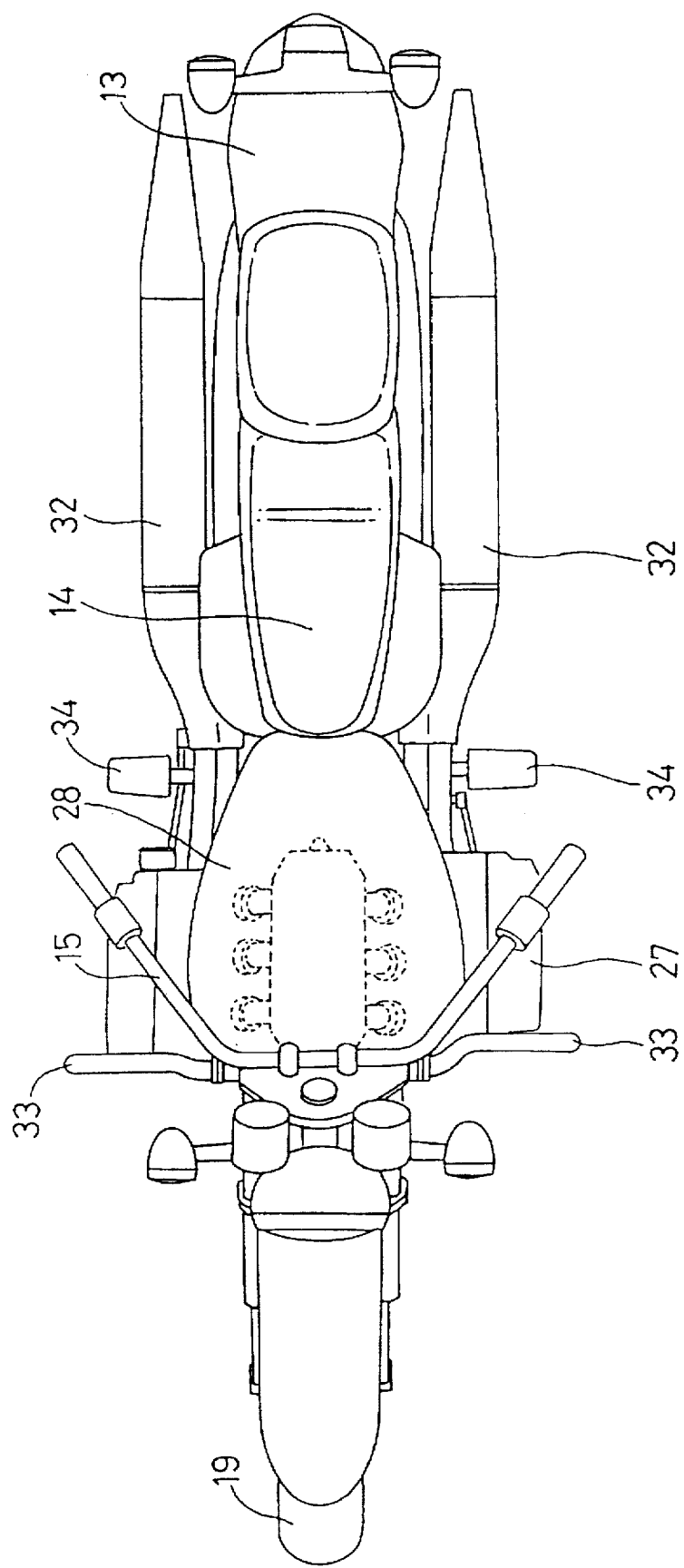
FIG. 3 is a plan view of the motorcycle.

On the other hand, guard pipes 33 are mounted between the front end portions of the sub-frame 25 and the lower end portions of the down frame 21 at each side of the engine 27. The guard pipes 33 are formed in such a shape as to surround the outside of the engine 27, as shown in the front view of FIG. 2. As shown in FIG. 6, the right guard pipe 33 is disposed slightly forwardly from the left guard pipe 33 because the cylinders at the right side of the engine 27 are disposed forwardly from the cylinder at the left side.

Steps 34, a change lever 35, a brake pedal 36, and a stand 37 are supported on the sub-frame 25 by means of brackets.

Figure 8:
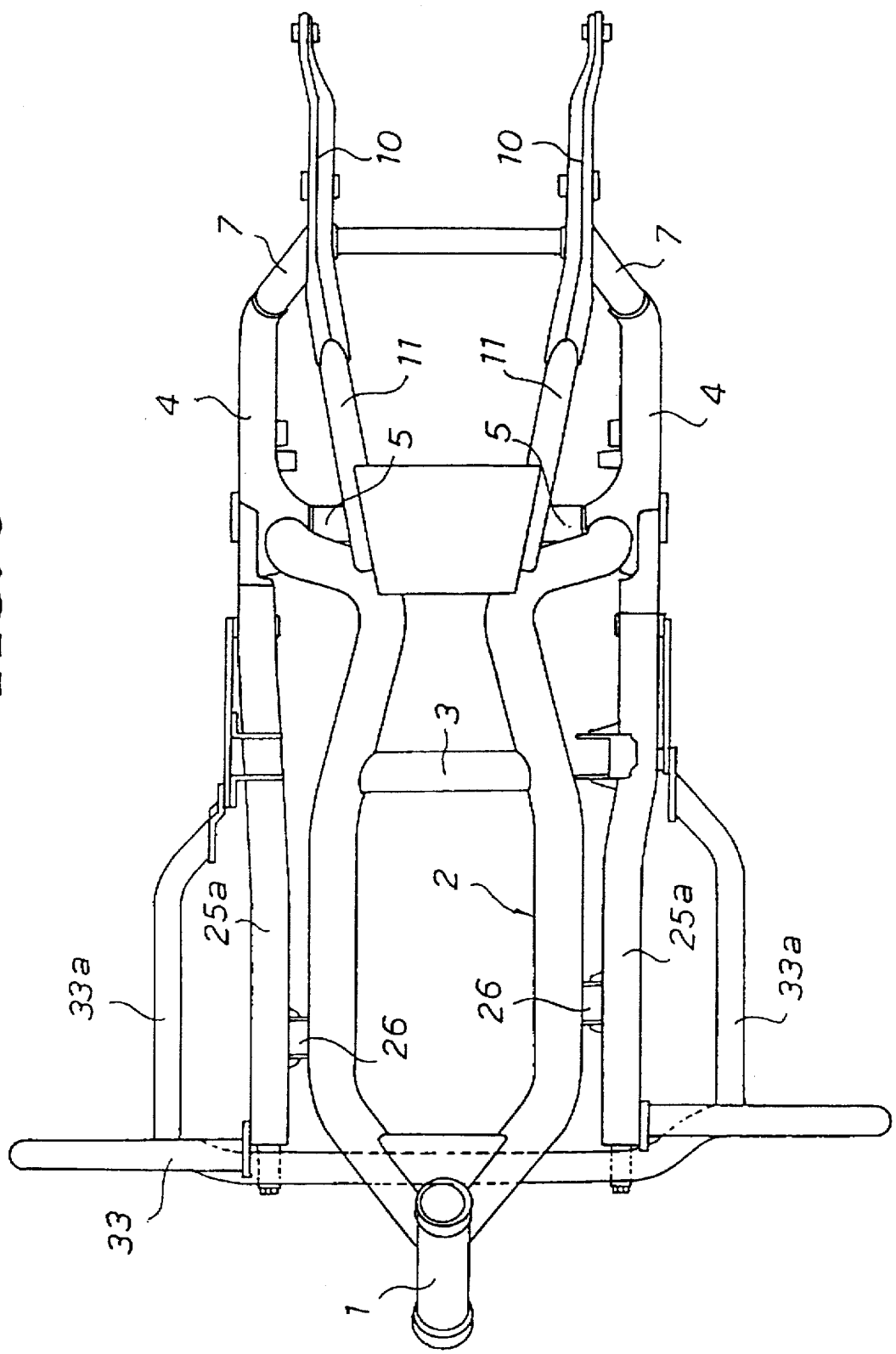
FIG. 8 is a plan view, similar to FIG. 6, showing another embodiment of the sub-frame.

FIG. 8 is a plan view, similar to FIG. 6, showing another embodiment of the sub-frame. In this embodiment, the sub-frame 25 is formed from a pair of right and left members 25a, 25a. The rear ends of the sub-frame members 25a, 25a are connected to the pivot plates 4 fixed at the lower end portions of the main frame 2. The terminal front end portions of the sub-frame members 25a, 25a extend approximately horizontally and forwardly from the connecting portions and are positioned lower than the terminal lower ends of the down frames 21. The sub-frame members 25a, 25a are not connected to the down frames 21, and guard pipes 33 are mounted between the front end portions of the sub-frame members 25a, 25a and the lower end portions of the down frames 21.

In assembling the frame structure, the main frame 2, down frames 21 and sub-frame 25 are connected to each other. The engine 27 is then mounted on the brackets 22, 24, 26 of the frames 2, 21, 25. Alternatively, the main frame 2 is assembled with the down frames 21, and then the sub-frame 25 is previously mounted on the engine 27, and is fixed on the main frame 2 and pivot plates 4 at the time when the engine 27 is supported on the main frame 2 and the down frames 21.

By previously mounting the sub-frame 25 on the engine 27 as described above, the engine 27 can be inserted into a space between the main frame 2 and the down frames 21 from the bottom thereof, thereby making the assembly of the frame structure easy. In addition, the sub-frame 25 previously mounted with the steps 34, change lever 35, brake pedal 36 and stand 37 may be easily mounted on the engine 27.

As described above, according to the present invention, the sub-frame is additionally provided on a diamond type frame as a vehicular frame of a motorcycle, and the sub-frame is U-shaped in a plan view, and the right and left open ends of the sub-frame are connected to the lower ends of the main frame and are made to extend approximately horizontally and forwardly therefrom. Consequently, the front end portions of the sub-frame 25 are not connected to the down frames 21, so that the whole weight of the frame structure can be lowered, resulting in a reduction in cost.

Since the sub-frame 25 is not connected to the down frames 21, it can be premounted on the engine 27, thus significantly improving the assembling efficiency of the frame structure. Moreover, by the use of the sub-frame 25 itself as the member for mounting guard pipes 33 of the engine 27, steps 34 or stand 37, the necessity of the provision of special stays and the like can be eliminated, thus further reducing the weight and cost of the frame structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frame structure for a motorcycle, comprising:

a head pipe;

a pair of right and left main frames extending obliquely, rearwardly and downwardly from said head pipe and having a front end portion and a rear end portion;

a pair of right and left down frames extending approximately downwardly from said head pipe and having an upper end portion and a lower end portion;

a sub-frame connected to said main frames, wherein said sub-frame having a U-shape, with a right rear end and a left rear end of said sub-frame being connected to the rear end portions of said right and left main frames by a pair of respective connecting portions, and a front end portion of said sub-frame extending approximately horizontally and forwardly from said connecting portions and being positioned lower than the lower end portions of said down frames; and wherein said main frames, said down frames and said sub-frame are adapted for mounting an engine thereto.

2. The frame structure for a motorcycle according to claim 1, wherein:

the front end portion of said U-shape sub-frame is not supported on the lower end portions of said down frames.

3. A frame structure for a motorcycle, comprising:

a pair of right and left main frames extending obliquely, rearwardly and downwardly from a head pipe and having a front end portion and a rear end portion;

a pair of right and left down frames extending approximately downwardly from said head pipe and having an upper end portion and a terminal lower end portion;

a sub-frame connected to said rear end portions of said main frames, with said sub-frame including a pair of right and left members wherein each of said members has a terminal front end and a rear end, with the rear ends of said sub-frame members being connected to said rear end portions of said right and left main frames by a pair of connecting portions, and the terminal front ends of said sub-frame members extending approximately horizontally and forwardly from the connecting portions and positioned lower than the terminal lower end portions of said down frames; and wherein said main frames, said down frames and said sub-frame are adapted for mounting an engine thereto.

4. The frame structure for motorcycle according to claim 3, wherein:

the front ends of said left and right sub-frame members are not supported on the lower end portions of said down frames.

5. A frame structure for a motorcycle having a pair of guard pipes mounted thereto, comprising:

a head pipe;

a pair of right and left main frames extending obliquely, rearwardly and downwardly from said head pipe and having a front end portion and a rear end portion;

a pair of right and left down frames extending approximately downwardly from said head pipe and having an upper end portion and a lower end portion;

a sub-frame connected to said main frames, wherein said sub-frame having a U-shape, with a right rear end and a left rear end of said sub-frame being connected to the rear end portions of said right and left main frames by a pair of respective connecting portions, and a front end portion of said sub-frame extending approximately horizontally and forwardly from said connecting portions and being positioned lower than the lower end portions of said down frames;

wherein said main frames, said down frames and said sub-frame are adapted for mounting an engine thereto; and wherein the lower end portions of said down frames and the front end portion of said U-shape sub-frame are adapted for mounting the pair of guard pipes therebetween.

6. A frame structure for a motorcycle having a pair of guard pipes mounted thereto, comprising:

a pair of right and left main frames extending obliquely, rearwardly and downwardly from a head pipe and having a front end portion and a rear end portion;

a pair of right and left down frames extending approximately downwardly from said head pipe and having an upper end portion and a lower end portion;

a sub-frame connected to said rear end portions of said main frames, with said sub-frame including a pair of right and left members wherein each of said members has a front end and a rear end, with the rear ends of said sub-frame members being connected to said rear end portions of said right and left main frames by a pair of connecting portions, and the front ends of said sub-frame members extending approximately horizontally and forwardly from the connecting portions and positioned lower than the lower end portions of said down frames;

wherein said main frames, said down frames and said sub-frame are adapted for mounting an engine thereto; and wherein said main frames, said down frames and said sub-frame front ends of said sub-frame members are adapted for mounting the pair of guard pipes therebetween.

7. A frame structure for a motorcycle having a pair of guard pipes, a pair of steps and a stand mounted thereto, which comprises:

a head pipe;

a pair of right and left main frames extending obliquely, rearwardly and downwardly from said head pipe and having a front end portion and a rear end portion;

a pair of right and left down frames extending approximately downwardly from said head pipe and having an upper end portion and a lower end portion;

a sub-frame connected to said main frames, wherein said sub-frame having a U-shape, with a right rear end and a left rear end of said sub-frame being connected to the rear end portions of said right and left main frames by a pair of respective connecting portions, and a front end portion of said sub-frame extending approximately horizontally and forwardly from said connecting portions and being positioned lower than the lower end portions of said down frames;

wherein said main frames, said down frames and said sub-frame are adapted for mounting an engine thereto; and wherein the lower end of portions of said down frames and the front end portion of said U-shape sub-frame are adapted for mounting the pair of guard pipes therebetween; and wherein said sub-frame is adapted for mounting thereto (i) the pair of steps and (ii) the stand.

8. The frame structure for motorcycle according to claim 7, wherein:

the front end portion of said U-shape sub-frame is not supported on the lower end portions of said down frames.

9. A frame structure for a motorcycle having a pair of guard pipes, a pair of steps and a stand, which comprises:

a pair of right and left main frames extending obliquely, rearwardly and downwardly from a head pipe and having a front end portion and a rear end portion;

a pair of right and left down frames extending approximately downwardly from said head pipe and having an upper end portion and a lower end portion;

a sub-frame connected to said rear end portions of said main frames, with said sub-frame including a pair of right and left members wherein each of said members has a front end and a rear end, with the rear ends of said sub-frame members being connected to said lower end portions of said right and left main frames by a pair of connecting portions, and the front ends of said sub-frame members extending approximately horizontally and forwardly from the connecting portions and positioned lower than the lower end portions of said down frames; and wherein said main frames, said down frames and said sub-frame are adapted for mounting an engine thereto; and wherein said sub-frame is adapted for mounting thereto (i) the pair of steps, and (ii) the stand.

10. The frame structure for a motorcycle according to claim 9, wherein:

the front ends of said left and right sub-frame members are not supported on the lower end portions of said down frames.

11. A frame structure for a motorcycle, comprising:
a head pipe;
a pair of right and left main frames extending obliquely, rearwardly and downwardly from said head pipe and having a front end portion and a rear end portion;
a gusset plate secured to said head pipe;
a pair of right and left down frames extending approximately downwardly from said gusset plate and having an upper end portion and a lower end portion;
a sub-frame connected to said main frames, said sub-frame having a U-shape, with a right rear end and a left rear end of said sub-frame being connected to the rear end portions of said right and left main frames by a pair of connecting portions, and a front end portion of said U-shaped sub-frame extending approximately horizontally and forwardly from said connecting portions and being positioned at a predetermined location being displaced beneath the lower end portions of said down frames; and
wherein said main frames, said down frames and said sub-frame are adapted for mounting an engine thereto.

12. A frame structure for a motorcycle having engine mounting brackets mounted thereon, comprising:
a head pipe;
a pair of right and left main frames extending obliquely, rearwardly and downwardly from said head pipe and having a front end portion and a rear end portion;
a pair of right and left down frames extending approximately downwardly from said head pipe and having an upper end portion and a terminal lower end portion;
a sub-frame connected to said main frames, said sub-frame including a pair of right and left members having terminal front and rear end portions, with the rear end portions of said sub-frame members being connected to the rear end portions of said right and left main frames by a pair of connecting portions, and the terminal front end portions of said sub-frame members extending approximately horizontally and forwardly from said pair of connecting portions and positioned lower than the terminal lower end portions of said down frames; and
wherein (i) said sub-frame is adapted for mounting the engine mounting brackets thereto, and (ii) said main frames, said down frames and said sub-frame are adapted for mounting an engine thereto.

13. A frame structure for a motorcycle having a pair of pipe guards mounted thereto, which comprises:
a head pipe;
a pair of right and left main frames extending obliquely, rearwardly and downwardly from said head pipe and having a front end portion and a rear end portion;
a gusset plate secured to said head pipe;
a pair of right and left down frames extending approximately downwardly from said gusset plate and having an upper end portion and a lower end portion;
a sub-frame connected to said main frames, said sub-frame having a U-shape, with a right rear end and a left rear end of said sub-frame being connected to the rear end portions of said right and left main frames by a pair of connecting portions, and a front end portion of said U-shaped sub-frame extending approximately horizontally and forwardly from said connecting portions and being positioned at a predetermined location being displaced beneath the lower end portions of said down frames;

wherein said main frames, said down frames and said sub-frame are adapted for mounting an engine thereto; and
wherein the lower end portions of said down frames and the front end portion of said U-shape sub-frame are adapted for mounting the pair of guard pipes therebetween.

14. A frame structure for a motorcycle having engine mounting brackets and a pair of guard pipes mounted thereto, comprising:
a head pipe;
a pair of right and left main frames extending obliquely, rearwardly and downwardly from said head pipe and having a front end portion and a rear end portion;
a pair of right and left down frames extending approximately downwardly from said head pipe and having an upper end portion and a lower end portion;
a sub-frame connected to said main frames, said sub-frame including a pair of right and left members having front and rear end portions, with the rear end portions of said sub-frame members being connected to the rear end portions of said right and left main frames by a pair of connecting portions, and the front end portions of said sub-frame members extending approximately horizontally and forwardly from said pair of connecting portions and positioned lower than the lower end portions of said down frames:
wherein (i) said sub-frame is adapted for mounting the engine mounting brackets thereto, and (ii) said main frames, said down frames and said sub-frame are adapted for mounting an engine thereto; and
wherein the lower end portions of said down frames and the front end portions of said sub-frame members are adapted for mounting the pair of guard pipes therebetween.

15. A frame structure for motorcycle having a pair of guard pipes mounted thereto, which comprises:
a head pipe;
a pair of right and left main frames extending obliquely, rearwardly and downwardly from said head pipe and having a front end portion and a rear end portion;
a gusset plate secured to said head pipe;
a pair of right and left down frames extending approximately downwardly from said gusset plate and having an upper end portion and a lower end portion;
a sub-frame connected to said main frames, said sub-frame having a U-shape, with a right rear end and a left rear end of said sub-frame being connected to the rear end portions of said right and left main frames by a pair of connecting portions, and a front end portion of said U-shaped sub-frame extending approximately horizontally and forwardly from said connecting portions and being positioned at a predetermined location being displaced beneath the lower end portions of said down frames;
wherein said main frames, said down frames and said sub-frame are adapted for mounting an engine thereto; and
wherein said U-shaped sub-frame is adapted for mounting thereto the pair of guard pipes.

16. A frame structure for a motorcycle having engine mounting brackets mounted thereon, comprising:
a head pipe;
a pair of right and left main frames extending obliquely, rearwardly and downwardly from said head pipe and having a front end portion and a rear end portion;

a pair of right and left down frames extending approximately downwardly from said head pipe and having an upper end portion and a terminal lower end portion;

a sub-frame connected to said main frames, said sub-frame including a pair of right and left members having terminal front and rear end portions, with the rear end portions of said sub-frame members being connected to the rear end portions of said right and left main frames by a pair of connecting portions, and the front end portions of said sub-frame members extending approximately horizontally and forwardly from said pair of connecting portions and positioned lower than the lower end portions of said down frames; and wherein (i) said sub-frame is adapted for mounting the engine mounting brackets thereto, and (ii) said main frames, said down frames and said sub-frame are adapted for mounting an engine thereto.

* * * * *